(12) United States Patent
Bajusz et al.

(10) Patent No.: US 8,967,958 B2
(45) Date of Patent: Mar. 3, 2015

(54) INTEGRATION OF AN AIR-LIQUID HEAT EXCHANGER ON AN ENGINE

(75) Inventors: Denis Bajusz, Remicourt (BE); David Depaepe, Liege (BE); Jacques Charlier, Thimister-Clermont (BE); Nicolas Raimarckers, Tourinne (BE)

(73) Assignee: Techspace Aero S.A. (BE)

( * ) Notice: Subject to any disclaimer, the term of this patent is extended or adjusted under 35 U.S.C. 154(b) by 593 days.

(21) Appl. No.: 12/971,532

(22) Filed: Dec. 17, 2010

(65) Prior Publication Data
US 2011/0150634 A1 Jun. 23, 2011

(30) Foreign Application Priority Data
Dec. 21, 2009 (EP) .................................... 09180064

(51) Int. Cl.
*F02C 7/14* (2006.01)
*F02K 3/115* (2006.01)

(52) U.S. Cl.
CPC . *F02K 3/115* (2013.01); *F02C 7/14* (2013.01); *Y02T 50/675* (2013.01)
USPC ........................................................ 415/178

(58) Field of Classification Search
CPC .................................. F02C 7/14; F02K 3/115
USPC ........................................................ 415/178
See application file for complete search history.

(56) References Cited

U.S. PATENT DOCUMENTS

| 4,254,618 A | * | 3/1981 | Elovic .......................... 60/226.1 |
| 5,269,135 A | | 12/1993 | Vermejan et al. |
| 5,392,614 A | * | 2/1995 | Coffinberry ..................... 62/402 |
| 5,581,996 A | * | 12/1996 | Koch et al. ....................... 60/782 |
| 2007/0215326 A1 | * | 9/2007 | Schwarz et al. ................ 165/96 |
| 2008/0095611 A1 | * | 4/2008 | Storage et al. ................ 415/116 |

FOREIGN PATENT DOCUMENTS

| EP | 0146487 A1 | 6/1985 |
| EP | 0511770 A1 | 11/1992 |
| FR | 2902830 A1 | 12/2007 |
| GB | 2270118 A | 3/1994 |

OTHER PUBLICATIONS

Search Report dated Jun. 3, 2010 for EP 09180064.

* cited by examiner

*Primary Examiner* — Ned Landrum
*Assistant Examiner* — Brian O Peters
(74) *Attorney, Agent, or Firm* — James E. Walton

(57) ABSTRACT

A bypass axial turbomachine includes a fan, a low pressure stator stage, a high pressure stator stage, the compressors being traversed by a flow referred to as primary flow of the turbomachine, at least one passage of discharge flow rate controlled from the primary flow in one of the stator stages toward the secondary flow, a heat exchanger of the surface air-oil (ACOC) type arranged flat on or in the wall surrounding the stator stages and defining the internal surface of the secondary flow, directly downstream of the junction of the passage of the discharge flow rate with said wall, so as to be run through by the secondary flow enriched with the discharge flow rate.

17 Claims, 2 Drawing Sheets

US 8,967,958 B2

INTEGRATION OF AN AIR-LIQUID HEAT EXCHANGER ON AN ENGINE

This application claims priority under 35 U.S.C. §119 to European Patent Application No. 09180064.9, filed 21 Dec. 2009, which is incorporated herein by reference for all purposes.

BACKGROUND

1. Field of the Application

The present application relates the integration of a heat exchanger of a lubrication and/or cooling circuit of an axial turbomachine, more particularly of a turbojet engine, so as to be able to ensure a satisfying cooling power.

2. Description of Related Art

Various mechanical or electrical elements of a turbomachine must be lubricated and/or cooled, such as, for example, certain bearings, certain reducers, and the electrical equipment. To do so, a lubrication circuit is provided. The oil plays the role of a lubricant and also of a heat transfer fluid, which necessitates providing for the heat thus collected to be evacuated. Current turbojet engines generate more and more heat, particularly for the following reasons:

- greater and greater weight of the bearing chambers, particularly in engines called "open rotor" equipped with two unducted fans;
- the integration of high-power reducers, particularly in the jet prop engines called "Geared Turbofan", where the fan is made to rotate at a lesser speed than the low-pressure compressor for the purpose of improving performance; and
- the integration of new equipment such as, for example, high-power starter/generators.

For these reasons, the oil-fuel exchangers (FCOC for Fuel cooling Oil cooling) are saturated and require the addition of cooling power via air-oil exchangers (ACOC for Air cooled Oil cooler). Various solutions are available to supply cool air for such exchangers, such as, for example, the use of one or several scoops on the fairing which causes an increase of the drag and an aerodynamic disturbance of the flow of the engine, and, consequently, a decrease of performance.

The dimensioning of these exchangers is carried out for critical operating conditions which generally correspond to running the engine at low-speed whereby a certain level of air cooling capacity is required due to the very low fuel flow rate (other available cool source) and whereby the available air flow rate is particularly low.

On modern bypass engines, a system for bleeding the primary circuit toward the secondary circuit having low-speed, makes it possible to maintain the operating stability of low-pressure and high-pressure compressors by avoiding the surging phenomenon. This discharge system usually comprises a variable opening valve system enabling a controlled bleed from the primary flow to the secondary flow (VBV for Variable Bleed Valve).

The European patent document EP 0146487 A1 discloses the arrangement of an air-oil exchanger (ACOC) arranged in deviation of a discharge passage between the primary flow and the secondary flow of a turbojet engine. The discharge flow rate is controlled by a mechanical system with a sliding valve arranged in a channel connecting the wall of the low-pressure compressor, in the vicinity of its last row of rotor blades, with the wall delineating the internal surface of the secondary flow. The heat exchanger is connected to this channel by way of downstream tapping of the sliding valve so as to receive a portion of the discharge flow rate and, consequently, so as to ensure the cooling of the lubrication circuit oil. A valve is arranged between the discharge flow rate tapping and the heat exchanger so as to be able to control the cooling capacity. This arrangement is interesting insofar as it allows for providing additional cooling of the hydraulic circuit oil. However, its drawback is that cooling is possible only in the presence of a discharge flow rate which is nonexistent at high speed since it would cause a loss of efficiency, unnecessary to the operating of the compressors. Furthermore, this device has drawbacks from the standpoint of head loss due to the air tapping and of the conduit sections. The cooling capacity is, consequently, decreased. Setting the heat exchanger in place is also made difficult because of its location.

The patent document EP 0511770 A1 discloses a device similar than that of the previous document with, however, a main difference: the heat exchanger is arranged directly in the discharge channel, in the vicinity of the wall delineating the internal surface of the secondary flow. A flap in the area of the compressor wall makes it possible to control the discharge flow rate. This device has the advantage of providing a greater cooling capacity than in the teaching of the previous document. However, although the cooling capacity is increased, it remains limited by the discharge flow rate, existing only at low speed (where the engine efficiency is less important).

The patent publication document US 2007/0215326 A1 discloses a retractable air-oil heat exchanger mounted in the wall delineating the internal surface of the secondary flow of a turbojet engine. It is arranged substantially more downstream in the area of the high pressure compressor and of the combustion chamber. This mounting is possible only at this location of the machine because of the space occupied associated to it. Such a solution is not adapted to solve the problem of low speed oil cooling since the secondary flow is too low at low speed to provide satisfying cooling. Although the heat exchanger described in this document allows limiting the head losses of each speed to the minimum necessary to cool the oil, it requires a mechanical actuation system costly in volume and mass.

Although great strides have been made in the area of axial compressors, many shortcomings remain.

DETAILED DESCRIPTION OF THE PREFERRED EMBODIMENT

Figure 1:
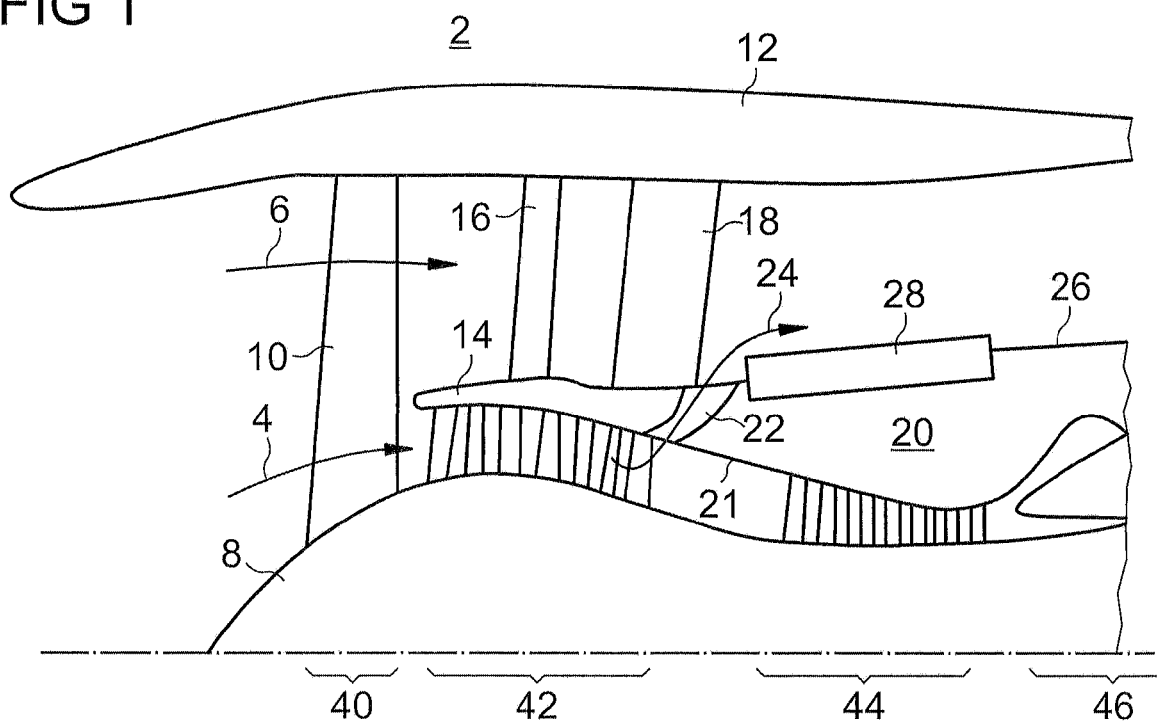
FIG. 1 is a schematic view of a bypass axial turbomachine in accordance with the subject application.

The present application discloses a solution to the cooling of the lubrication circuit oil of a turbomachine, in particular for operating points of the machine at low speed where the available air flow rate is low while reducing to the maximum the possible performance losses.

The subject application includes a bypass axial turbomachine comprising: an axial compressor, the compressor being traversed by a flow, referred to as primary, of the turbomachine; a wall surrounding the compressor and delineating the internal surface of a flow, referred to as secondary, of the turbomachine; a passage adapted to generate a discharge flow rate controlled from the primary flow in the compressor toward the secondary flow, the passage opening out into the wall delineating the internal surface of the secondary flow; an oil lubrication and/or cooling circuit of elements of the turbomachine; a heat exchanger adapted to cool the oil of the lubrication circuit and arranged, at least partially, directly in the discharge flow rate; the turbomachine being remarkable in that the heat exchanger is arranged in the secondary flow directly downstream of the junction of the discharge flow rate passage with the wall delineating the internal surface of the secondary flow.

The heat exchanger is arranged in the direct vicinity of the junction of the passage of the discharge flow rate with the wall delineating the internal surface of the secondary flow and downstream of this junction so as to be traveled at least partially directly by the discharge flow rate while being arranged in the secondary flow. The portion of the discharge flow rate of the primary flow running through the heat exchanger can be of at least 40%, preferably at least 50%, more preferably yet at least 60%. This initial arrangement of the heat exchanger makes it possible to benefit from the flow rate of the secondary flow at high speeds and to complete the latter by the discharge flow at low speeds, thus providing a better cool source to the dimensioning cases of the exchanger, which thus requires a smaller exchange surface, and thus generates less aerodynamic disturbance. The distance between the heat exchanger and the junction will be decreased and depend upon the general design of the heat exchanger, of the junction of the discharge passage with the wall delineating the internal surface of the secondary flow and of this wall.

According to an advantageous embodiment of the present application, the exit of the passage of the discharge flow rate is inclined with respect to the wall delineating the internal surface of the secondary flow so that the main axis of said passage forms an angle of at least 70°, preferably 50°, with said wall. This measure enhances the aerodynamic flow in the area of the junction and, most of all, enables the heat exchanger to recover an important portion of the discharge flow rate for cooling purposes.

According to yet another advantageous embodiment of the present application, the heat exchanger is of the surface type with a heat exchange surface generally parallel to the wall delineating the internal surface of the secondary flow, and the heat exchanger is arranged flat on, or at least partially in the wall delineating the internal surface of the secondary flow. This arrangement is particularly simple, economical, light, and efficient, from an aerodynamic as well as from a thermal standpoint.

According to yet another advantageous embodiment of the present application, the heat exchanger is at least partially integrated in the wall delineating the internal surface of the secondary flow so its exchange surface is aligned with said wall. Preferably, it is essentially the portion of the exchanger forming the oil circuit which is integrated in the wall in question. The effect of this integration is to minimize the disturbance of the secondary flow.

According to yet another advantageous embodiment of the present application, the heat exchanger comprises means for guiding the flow, the guiding means preferably forming one or several channels on the exchange surface of the heat exchanger. The effect of this measure is to augment the exchange capacity of the exchanger by the use of a more optimized exchange surface (being in a zone protected by the upper plate, it must no longer respond to criteria of holding up to impacts) and by the maintenance of the air flow cooling this surface all along the exchanger.

According to yet another advantageous embodiment of the present application, the means for guiding the flow comprise a guiding wall arranged at a distance from the exchange surface of the heat exchanger, of fins being preferably arranged between the exchange surface and the guiding wall. This construction of the guiding means is particularly simple, economical, and efficient.

According to yet another advantageous embodiment of the present application, the guiding wall projects from the heat exchanger on the upstream side and is arranged partially in the outlet flow of the passage of the discharge rate so as to guide at least a portion of the discharge rate toward the exchange surface of the heat exchanger.

According to yet another advantageous embodiment of the present application, the heat exchanger, the guiding wall, and the wall delineating the internal surface of the secondary flow are arranged so that the guiding wall is aligned with the wall delineating the internal surface of the secondary flow.

According to yet another advantageous embodiment of the present application, the wall delineating the internal surface of the secondary flow has a recess where the heat exchanger is placed so that the guiding wall is aligned with the wall delineating the internal surface of the secondary flow outside the recess.

According to yet another advantageous embodiment of the present application, the guiding wall projects from the heat exchanger on the downstream side.

According to yet another advantageous embodiment of the present application, the heat exchanger comprises several superposed heat exchange surfaces generally parallel to the wall delineating the internal surface of the secondary flow.

According to yet another advantageous embodiment of the present application, the heat exchanger is of the surface type with at least two opposed and parallel heat exchange surfaces, the heat exchanger being arranged at a distance from the wall delineating the internal surface of the secondary flow, so that its two surfaces (secondary flowpath side and wall side) are swept by the air flow.

According to yet another advantageous embodiment of the present application, the heat exchanger is arranged in alignment and in the continuity of the wall delineating the internal surface of the secondary flow in the vicinity of the upstream side of the junction of the passage of the discharge flow rate with said wall, said wall being lowered on the downstream side of said junction so as to create a passage section for the discharge flow rate with the heat exchanger.

According to yet another advantageous embodiment of the present application, the turbomachine comprises a plurality of heat exchangers and/or discharge flow rate passages, each of said passages being preferably aligned with one or several of said heat exchangers.

The present application also includes a method for cooling the oil of a lubrication and/or cooling circuit of a bypass axial turbomachine, the turbomachine comprising an axial compressor, the compressor being traversed by a flow, referred to as primary, of the turbomachine; a wall surrounding the compressor and delineating the internal surface of a flow, referred to as secondary, of the turbomachine. A passage adapted to generate a discharge flow rate controlled from the primary flow in the compressor toward the secondary flow, the passage opening out into the wall delineating the internal surface of the secondary flow; the method comprising the fact of placing the heat exchanger in the discharge flow rate of the primary flow; and remarkably, in that the fact of placing the heat exchanger comprises the fact of placing it in the secondary flow downstream of the junction of the passage of the discharge flow rate with the wall delineating the internal surface of the secondary flow.

The advantageous characteristics explained hereinabove for the turbomachine also apply to the above-mentioned method.

A bypass turbojet engine 2 is shown in FIG. 1. The various main portions, namely the fan portion or "fan" 40 generating the primary flow 4 and the secondary flow 6, the low pressure compressor portion 42, the high pressure compressor portion 44, and the combustion portion 46, can be distinguished. The rotor 8 comprises a ventilator or "fan" 10 as well as a series of rotor blades of the low pressure and high pressure compressor portions. A separator nose 14 divides the air flow into a primary flow 4 traversing the stator stages and a secondary flow 6 forming an annular fluid flowpath flowing around the primary flow 4. A wall 26 in the extension of the separator nose delineates the internal surface of the secondary flow. The nose 14 and this wall 26 are connected to the outer casing 12 via the support arms 16 and 18.

The primary flow follows a trajectory which is not rectilinear but rather undulated. The primary flowpath has an annular section whose size varies as a function of the position in the first and second compressors. The primary flowpath narrows from the exit of the first low pressure compressor up to the entry of the second high pressure compressor. This geometry reserves a certain volume 20 between the wall 21 delineating the exterior surface of the primary flowpath and the wall 26 delineating the interior or internal surface of the secondary flowpath.

A channel or passage 22 crosses through the volume 20 from the wall 21 up to the wall 26. It connects the primary flow from approximately the exit of the low pressure compressor to the secondary flow downstream of the junction of the channel 22 with the wall 21, in the precise case of FIG. 1, approximately in the area of the support arm 18. This way, the channel is inclined and makes a general angle with the wall 26 less than 90° so that the average speed vector of the fluid reaching the secondary flow has a non-negligible component directed according to the direction and the sense of flow of the secondary flow. This favors the discharge flow ensured by the channel 22, this flow being symbolized by the arrow 24. Means for controlling and regulating the discharge flow rate passing through the channel 22 are provided but not represented. These means are well-known to one having ordinary skill in the art and can comprise, by way of example, means with motorized flap or hydraulic or pneumatic control. This system for discharging the primary flow toward the secondary flow allows, in a known manner, the turbomachine functioning at low speed to keep an aerodynamic stability and to prevent surging phenomena.

A surface heat exchanger 28 is integrated in the wall 26 directly after the junction of the channel 22 with said wall in the flow direction of the fluid. This heat exchanger is of the air-oil type or of the ACOC type (Air Cooled Oil Cooler) and is connected to the lubrication circuit (not shown) of the turbomachine. The arrangement of the heat exchanger enables it to be constantly run through by the secondary flow while disturbing the flow only very slightly and to be also run through by a large portion of the discharge flow rate of the primary flow reaching the secondary flow. Under the most critical operating conditions from the cooling standpoint, that is, when the turbomachine operates at low speed, the heat exchanger is run through by the secondary flow enriched by the discharge flow. This arrangement results in an optimum use of the streams available while disturbing them only slightly. Despite the fact that these measures ensure a sufficient cooling capacity, they also allow for a reduced dimensioning of the heat exchanger and, consequently, a non-negligible weight saving.

The exchanger is preferably of the planar or surface type, that is, having at least one side or surface corresponding essentially to the size of the exchanger and adapted to be run through by a fluid in motion in view of ensuring a heat exchange. This type of heat exchanger is particularly well-adapted for placing a wall such as the wall 26 delineating the internal surface of the secondary flow. It goes without saying that the heat exchanger 28 can be slightly curved in order to conform to the wall 26 which is generally cylindrical.

As a function of various dimensioning parameters, several heat exchangers can be arranged on the perimeter of the wall 26, preferably so that each exchanger is generally aligned with a discharge channel. However, one could envision that only some of the heat exchangers distributed on the perimeter of the wall 26 are arranged facing a discharge channel, the others being run through essentially only by the secondary flow. It is also possible to provide fewer heat exchangers than there are discharge channels.

Figure 2:
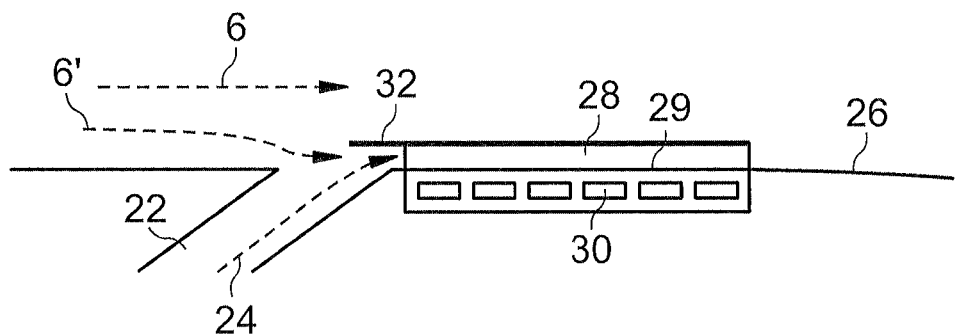
FIG. 2 is a schematic view showing a first mode, in keeping with the subject application, of integration of a heat exchanger in the wall delineating the internal surface of the secondary flow.

A first mode of integration of the heat exchanger 28 in the wall 26 is shown schematically in FIG. 2. The surface heat exchanger 28 is generally planar or curved in order to conform to the shape of the wall 26. It comprises in the thickness of its material a series of channels 30 run through by the oil to be cooled. These channels can have various shapes, such as, for example, a series of channels arranged in parallel or a coil-shaped continuous channel or a combination of both these arrangements. The heat exchanger 28 is integrated or is "buried" in the wall 26 so its exchange surface 29 is approximately aligned with the exterior surface of the wall 26. The heat exchanger comprises a guiding wall 32 adapted to guide the flow encountering the heat exchanger so as to ensure a satisfactory flow along the exchange surface 29. This wall 32 is generally parallel to the wall 26 and, consequently, to the exchange surface 29 so as to form a flow channel along this surface 29. The guiding wall 32 projects from the heat exchanger on the upstream side. It makes it possible to pick up and guide, like a scoop would, a portion of the secondary flow 6 toward the exchange surface 29. This portion of the secondary flow which is picked up is shown by the arrow 6'. This projecting portion is arranged in the exit beam of the discharge channel 22 in order to guide a portion of the discharge flow rate toward the heat exchanger. To do so, the exchanger is arranged in the possible immediate vicinity of the junction of the channel 22 with the wall 26. As a function of the proximity of the heat exchanger with the junction of the channel 22 with the wall 26, the guiding wall 32 will then extend more or less at the front or upstream edge of the heat exchanger so as to partially encounter the geometrical exit beam of the discharge channel 22. This way, a main portion of the discharge flow rate 24 is deviated toward the heat exchanger.

Figure 3:
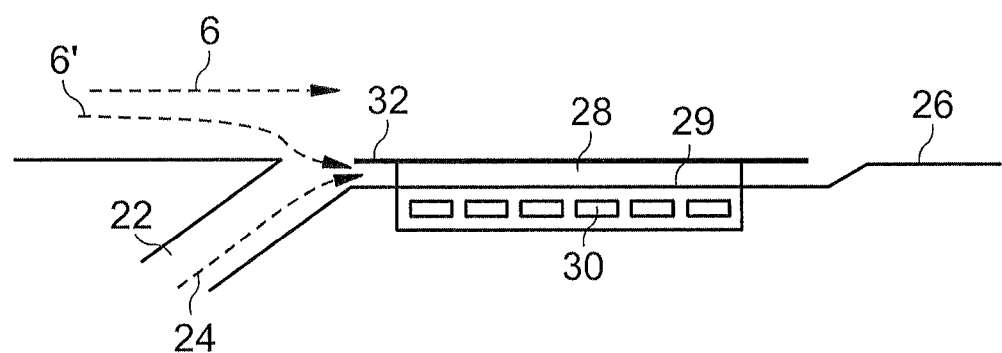
FIG. 3 is a schematic view showing a second mode, in keeping with the subject application, of integration of a heat exchanger in the wall delineating the internal surface of the secondary flow.

A second integration mode of the heat exchanger 28 in the wall 26 is shown schematically in FIG. 3. In this case, the wall 26 has a recess where the heat exchanger is arranged. Similarly to the previous mode shown in FIG. 2, the heat exchanger is integrated or embedded in the wall 26, but this time, in a recessed portion of the wall 26. Similarly to the heat exchanger shown in FIG. 2, it is of the planar or surface type and comprises, in the thickness of its material, a series of channels 30 run through by the oil to be cooled. It comprises an exchange surface 29 corresponding essentially to the dimension of the exchanger. The latter is arranged in the wall 26 so that the exchange surface 29 is aligned with the recessed portion of the wall 26. It must be noted that the recess of the wall 26 extends from the junction of the discharge channel 22 with the wall 26 up to a certain distance downstream, this distance being greater than the length of the heat exchanger 28. Similarly to this configuration in FIG. 2, the heat exchanger comprises a guiding surface 32 generally parallel to the wall 26 and to the exchange surface 29. Contrary to the configuration of FIG. 2, the exchange surface is, this time, aligned with the wall 26 outside of its recess. This means that the wall 26 is recessed so that the guiding surface 32 is aligned with the wall delineating the internal surface of the fluid flowpath of the secondary flow. The guiding wall 32 projects from the exchanger on the upstream side for the same reasons as in the configuration of FIG. 2. This projecting portion is arranged in the exit flow of the discharge channel 22 so as to deviate a substantial portion of the discharge flow rate 24 toward the heat exchanger. It must, however, remain at a distance from the wall 26 on the upstream side so as to enable a portion 6' of the secondary flow 6 to be picked up and deviated by this projecting portion of the guiding wall 32 toward the heat exchanger 28. The guiding wall 32 can also project on the downstream side while remaining at a distance from the wall 26 in its alignment so as to leave an exit section for the flow running through the exchange surface 29. This mode of integration of the heat exchanger has the advantage of disturbing the secondary flow even less with respect to the mode of FIG. 1. The portion 6' of secondary flow 6 which is thus picked up is, however, smaller.

Figure 4:
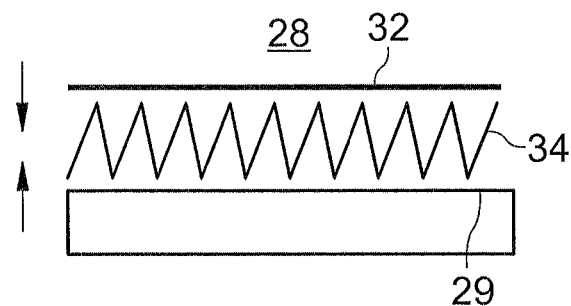
FIG. 4 is a schematic view of an embodiment example of a heat exchanger intervening in the subject application.

The channel formed by the guiding wall can comprise separation walls so as to form a series of parallel channels oriented in the flow direction of the secondary flow. It can also comprise fins projecting from the exchange surface 29. These fins can be parallel and unitary with the material of the exchanger. They can also have the shape of a sheet of metal folded as an accordion sandwiched between the exchange surface and the guiding wall, as shown in FIG. 4. FIG. 4 is indeed a front view (according to the direction of the flow) of the heat exchanger 28. A sheet of metal folded as an accordion 34 is brazed at the exchange surface 29 to serve as fins. The sheet of metal defines, with the exchange surface 29 and the guiding wall 32, a series of flow and cooling channels. This measure allows for increasing the exchange capacity of the heat exchanger. The sheet of metal 34 shown can also be folded differently, such as, for example, in an undulated shape or any other shape adapted to augment the exchange capacity without augmenting the associated head losses.

It must be noted that the integration modes of the heat exchanger shown in FIGS. 2 and 3 are given only by way of example. Indeed, other implementations and arrangements of the heat exchanger are possible. For example, a particularly slim heat exchanger having two opposite exchange surfaces could be provided; this exchanger being arranged at a distance from the wall 26 similarly to the guiding wall 32 so as to be run through by the secondary flow on its surface opposite the wall 36 and by a portion of the secondary flow enriched by the discharge flow on its side facing the wall 26. Such a heat exchanger can also be provided to be arranged in alignment with the wall portion 26 situated upstream of the junction with the discharge channel 22, similarly to the separation wall in FIG. 3. The exchanger could even cover the entirety of the junction of the discharge channel 22 with the wall 26 so as to form a screen for separating the secondary and the discharge flows up to the point where these two flows meet together at the exit of the exchanger. The advantage of such a construction is to have a substantial exchange capacity due to the use of two exchange surfaces; however, there are certain constraints due to the thickness of the exchanger so as to minimally disturb the flow in the secondary flowpath.

Other constructions and/or arrangements of one or several heat exchangers are possible and will depend on various dimensioning constraints such as the power to be evacuated, the geometry of the wall 26, the space available for the integration in the wall and the tolerable disturbance of the flow of the secondary flowpath.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present application is shown in a limited number of forms, it is not limited to just these forms, but is amenable to various changes and modifications without departing from the spirit thereof.

We claim:

1. A bypass axial turbomachine, comprising:
    an axial compressor, the compressor being traversed by a flow referred to as primary of the turbomachine;
    an annular wall surrounding the compressor and delineating an internal surface of a flow referred to as secondary of the turbomachine;
    a passage configured to generate a discharge flow rate controlled from the primary flow in the compressor toward the secondary flow, the passage opening into the wall delineating the internal surface of the secondary flow, the discharge flow rate forming an exit flow of the passage;
    an oil lubrication and cooling circuit for lubricating and cooling elements of the turbomachine; and
    a heat exchanger configured to cool the oil of the lubrication circuit and arranged at least partially directly in the discharge flow rate of the primary flow, the heat exchanger being arranged in the annular secondary flow, on the annular wall, directly downstream of the junction of the passage of the discharge flow rate with the annular wall, the heat exchanger comprising a flow guiding wall extending on the upstream side, the upstream side of the flow guiding wall partially encountering the exit flow of the discharge flow rate, the flow guiding wall being configured to extend partially over the passage.

2. The bypass axial turbomachine according to claim 1, wherein the exit of the passage of the discharge flow rate is inclined with respect to the wall delineating the internal surface of the secondary flow, so that the main axis of the passage forms an angle of less than about 70° with the wall.

3. The bypass axial turbomachine according to claim 1, wherein the exit of the passage of the discharge flow rate is inclined with respect to the wall delineating the internal surface of the secondary flow, so that the main axis of the passage forms an angle of less than about 50° with the wall.

4. The bypass axial turbomachine according to claim 1, wherein the heat exchanger is of the surface type with at least one heat exchange surface generally parallel to the wall delineating the internal surface of the secondary flow and is arranged flat on the wall delineating the internal surface of the secondary flow.

5. The bypass axial turbomachine according to claim 1, wherein the heat exchanger is of the surface type with at least one heat exchange surface generally parallel to the wall delineating the internal surface of the secondary flow and is disposed at least partially in the wall delineating the internal surface of the secondary flow.

6. The bypass axial turbomachine according to claim 1, wherein the heat exchanger is at least partially integrated in the wall delineating the internal surface of the secondary flow, so that a heat exchange surface is aligned with the wall.

7. The bypass axial turbomachine according to claim 1, wherein the heat exchanger is of the surface type with at least one heat exchange surface generally parallel to the wall delineating the internal surface of the secondary flow and comprises:
 at least one channel for guiding the secondary flow, each channel forming with the heat exchange surface of the heat exchanger.

8. The bypass axial turbomachine according to claim 7, wherein the at least one channel comprises:
 a guiding wall arranged at a distance from the heat exchange surface of the heat exchanger; and
 at least one fin disposed between the heat exchange surface and the guiding wall.

9. The bypass axial turbomachine according to claim 8, wherein the guiding wall projects from the heat exchanger on an upstream side and is partially arranged in an exit flow of the passage of the discharge flow rate, so as to guide at least a portion of the discharge flow rate toward the heat exchange surface of the heat exchanger.

10. The bypass axial turbomachine according to claim 7, wherein the heat exchanger, the guiding wall, and the wall delineating the internal surface of the secondary flow are arranged so that the guiding wall is aligned with the wall delineating the internal surface of the secondary flow.

11. The bypass axial turbomachine according to claim 10, wherein the wall delineating the internal surface of the secondary flow comprises:
 a recess at the location of the heat exchanger, so that the guiding wall is aligned with the wall delineating the internal surface of the secondary flow outside the recess.

12. The bypass axial turbomachine according to claim 7, wherein the guiding wall projects from the heat exchanger on the downstream side.

13. The bypass axial turbomachine according to claim 1, wherein the heat exchanger comprises:
 a plurality of superposed heat exchange surfaces disposed generally parallel to the wall delineating the internal surface of the secondary flow.

14. The bypass axial turbomachine according to claim 1, wherein the heat exchanger is of the surface type with at least two opposite, parallel, heat exchange surfaces, the heat exchanger being arranged at a distance from the wall delineating the internal surface of the secondary flow.

15. The bypass axial turbomachine according to claim 14, wherein the heat exchanger is arranged in the alignment and the continuity of the wall delineating the internal surface of the secondary flow in the vicinity of the upstream side of a junction of the passage of the discharge flow rate with the wall, the wall being lowered on the downstream side of the junction, so as to create a passage section for the discharge flow rate with the heat exchanger.

16. The bypass axial turbomachine according to claim 1, further comprising:
 at least one additional heat exchanger and one additional passage of discharge flow rate, each passage being preferably aligned with at least one heat exchanger.

17. A method of cooling oil of a lubrication and cooling circuit of a bypass axial turbomachine having an axial compressor traversed by a flow referred to as primary of the turbomachine, and an annular wall surrounding the compressor and delineating an internal surface of a flow referred to as secondary of the turbomachine, the method comprising:
 generating a discharge flow rate through a passage opening into the annular wall, the discharge flow rate being controlled from the primary flow in the compressor toward the secondary flow;
 disposing a heat exchanger in the discharge flow rate of the primary flow and in the secondary flow downstream of the junction of the passage with the wall; the heat exchanger comprising a flow guiding wall extending on the upstream side, the upstream side of the flow guiding wall partially encountering the passage of the discharge flow rate; and
 circulating the oil of the lubrication and cooling circuit through the heat exchanger.

* * * * *